United States Patent
Abe et al.

(10) Patent No.: US 9,930,245 B2
(45) Date of Patent: Mar. 27, 2018

(54) FOCUS CONTROL APPARATUS AND CONTROL METHOD FOR THE SAME

(71) Applicant: CANON KABUSHIKI KAISHA, Tokyo (JP)

(72) Inventors: Hiroshi Abe, Kawasaki (JP); Kazuyuki Nakagawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/384,739

(22) Filed: Dec. 20, 2016

(65) Prior Publication Data

US 2017/0180629 A1 Jun. 22, 2017

(30) Foreign Application Priority Data

Dec. 22, 2015 (JP) .................................. 2015-250496

(51) Int. Cl.
| | |
|---|---|
| *H04N 5/232* | (2006.01) |
| *G02B 3/00* | (2006.01) |
| *G02B 7/36* | (2006.01) |

(52) U.S. Cl.
CPC ....... *H04N 5/23212* (2013.01); *G02B 3/0006* (2013.01); *G02B 7/36* (2013.01); *H04N 5/23209* (2013.01)

(58) Field of Classification Search
None
See application file for complete search history.

(56) References Cited

U.S. PATENT DOCUMENTS

2001/0022626 A1* 9/2001 Nozaki .............. H04N 5/23212
348/345

FOREIGN PATENT DOCUMENTS

JP 2005-109621 A 4/2005

* cited by examiner

*Primary Examiner* — Mark T Monk
(74) *Attorney, Agent, or Firm* — Carter, DeLuca, Farrell & Schmidt, LLP

(57) ABSTRACT

In an focus control apparatus, a focus detection unit detects a defocus value, a control unit controls focus position adjustment, a first acquisition unit acquires reliability of the defocus value, a storage unit stores images captured by an image sensor at an in-focus position based on the defocus value and other focus positions and the defocus value detected for each image, in association with each image, and a second acquisition unit acquires a first correction value to be used for correcting the focus position adjustment based on the defocus values of unselected images in a case where the reliability of the defocus value corresponding to a selected image is lower than a first threshold, wherein The control unit adjusts the focus position using the first correction value.

18 Claims, 9 Drawing Sheets

FOCUS CONTROL APPARATUS AND CONTROL METHOD FOR THE SAME

BACKGROUND OF THE INVENTION

Field of the Invention

The present invention relates to a focus control apparatus and a control method for the same, and an image capturing apparatus, and in particular relates to a focus control apparatus capable of performing automatic focus adjustment (AF), and a control method for the same and an image capturing apparatus provided with the same.

Description of the Related Art

Single-lens reflex cameras are often provided with a focus detection system that uses a phase difference detection method to detect the focus state (defocus value) of the imaging optical system based on the phase difference between a pair of images formed by light that passed through the imaging optical system in an interchangeable lens. However, in this phase difference detection method, there is a risk of not being able to accurately detect the in-focus position due to the influence of the environment or the like at the time of imaging, and due to manufacturing error in single-lens reflex cameras and interchangeable lenses.

In order to solve this problem, there is an image capturing apparatus having a function (AF micro adjustment) for allowing the user to make desired micro adjustments to a correction value for the automatic focus adjustment function (AF). However, the AF micro adjustment contains a problem in that the operations of image capturing and checking need to be performed repeatedly in order to check whether or not the result of the user's micro adjustment is correct.

In order to resolve the above problem, Japanese Patent Laid-Open No. 2005-109621 discloses an image capturing apparatus that has a function in which focus bracket imaging is performed while associating the defocus values of the imaging lens with images, and an AF correction value is automatically calculated based on a defocus value associated with an image selected by the user from among a plurality of shot images.

However, according to the technique disclosed in Japanese Patent Laid-Open No. 2005-109621, an incorrect AF correction value is calculated due to a detection error of the defocus values associated with the images, which may degrade the detection precision of the defocus value.

SUMMARY OF THE INVENTION

The present invention has been made in consideration of the above situation, and obtains a more accurate AF correction value.

According to the present invention, provided is an focus control apparatus comprising: a focus detection unit that detects a defocus value; a control unit that controls focus position adjustment using the defocus value; a first acquisition unit that acquires reliability of the defocus value; a storage unit that stores a plurality of images captured by an image sensor at a plurality of focus positions including an in-focus position based on the defocus value detected by the focus detection unit, and the defocus value detected for each of the plurality of images by the focus detection unit in association with each of the plurality of images; and a second acquisition unit that, in a case where the reliability of the defocus value corresponding to a selected image from among the plurality of images is lower than a first threshold, acquires a first correction value to be used for correcting the focus position adjustment based on the defocus values of a plurality of unselected images among the plurality of images, wherein the control unit adjusts the focus position using the first correction value in a case where the reliability of the defocus value corresponding to the selected image is lower than the first threshold.

Further, according to the present invention, provided is an focus control apparatus comprising: a focus detection unit that detects a defocus value; a control unit that controls focus position adjustment using the defocus value; an acquisition unit that acquires a first correction value for correcting a detection error of an in-focus position of a focus lens obtained based on the defocus value detected by the focus detection unit; and a storage unit that stores a plurality of images captured by an image sensor at a plurality of focus positions including an in-focus position based on the defocus value detected by the focus detection unit, and the first correction value and reliability of the first correction value in association with each of the plurality of images, wherein, in a case where the reliability of the first correction value associated with a selected image from among the plurality of images is lower than a threshold, the acquisition unit acquires a second correction value of the selected image using the first correction values of a plurality of unselected images among the plurality of images, and wherein the control unit adjust the focus position using the second correction value in a case where the reliability of the first correction value associated with the selected image among the plurality of images is lower than the threshold.

Furthermore, according to the present invention, provided is an image capturing apparatus comprising: an focus control apparatus that includes: a focus detection unit that detects a defocus value; a control unit that controls focus position adjustment using the defocus value; a first acquisition unit that acquires reliability of the defocus value; a storage unit that stores a plurality of images captured by an image sensor at a plurality of focus positions including an in-focus position based on the defocus value detected by the focus detection unit, and the defocus value detected for each of the plurality of images by the focus detection unit in association with each of the plurality of images; and a second acquisition unit that, in a case where the reliability of the defocus value corresponding to a selected image from among the plurality of images is lower than a first threshold, acquires a first correction value to be used for correcting the focus position adjustment based on the defocus values of a plurality of unselected images among the plurality of images; and the image sensor that captures an image by photoelectrically converting light emitted from a subject and passed through a focus lens, wherein the control unit adjusts the focus position using the first correction value in a case where the reliability of the defocus value corresponding to the selected image is lower than the first threshold, and wherein the plurality of images stored in the storage unit are those captured by the image sensor.

Further, according to the present invention, provided is an image capturing apparatus comprising: an focus control apparatus that includes: a focus detection unit that detects a defocus value; a control unit that controls focus position adjustment using the defocus value; an acquisition unit that acquires a first correction value for correcting a detection error of an in-focus position of a focus lens obtained based on the defocus value detected by the focus detection unit; and a storage unit that stores a plurality of images captured by an image sensor at a plurality of focus positions including an in-focus position based on the defocus value detected by the focus detection unit, and the first correction value and reliability of the first correction value in association with each of the plurality of images; and the image sensor that captures an image by photoelectrically converting light emitted from a subject and passed through a focus lens, wherein, in a case where the reliability of the first correction value associated with a selected image from among the plurality of images is lower than a threshold, the acquisition unit acquires a second correction value of the selected image using the first correction values of a plurality of unselected images among the plurality of images, wherein the control unit adjust the focus position using the second correction value in a case where the reliability of the first correction value associated with the selected image among the plurality of images is lower than the threshold, and wherein the plurality of images stored in the storage unit are those captured by the image sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
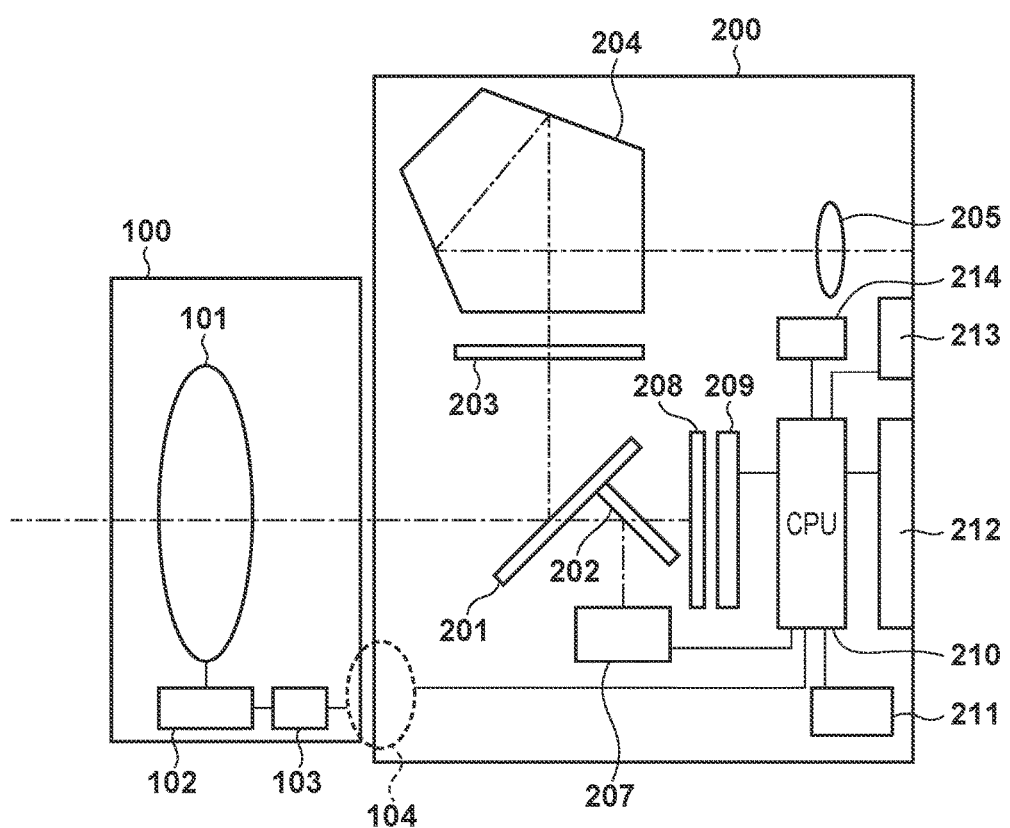
FIG. 1 is a block diagram showing a schematic configuration of an image capturing apparatus according to an embodiment of the present invention.

FIG. 1 is a block diagram showing the schematic configuration of an image capturing apparatus according to the first embodiment. As shown in FIG. 1, an imaging lens 100 is removably attached to an image capturing apparatus 200 via a lens mounting mechanism of a mount unit (not shown). The mount unit is provided with an electrical contact unit 104. The image capturing apparatus 200 performs communication with the imaging lens 100 via the electrical contact unit 104, and controls a focus lens 101 in the imaging lens 100. Note that although FIG. 1 shows only the focus lens 101 as a lens in the imaging lens 100, various other lenses such as a zoom lens and a fixed lens are normally provided as well.

Light flux from a subject (not shown) is guided to a main mirror 201 in the image capturing apparatus 200 via the focus lens 101 in the imaging lens 100. The main mirror 201 is arranged with an inclination relative to the optical axis in the imaging light path, and can move to a first position (the illustrated position) for guiding light flux from the subject to a viewfinder optical system thereabove, and a second position of being retracted outside the imaging light path. Also, the central portion of the main mirror 201 is a half-mirror, and a portion of the light flux from the subject passes through the half-mirror portion when the main mirror 201 is mirrored-down to the first position. This transmitted light flux is reflected by a sub mirror 202 provided on the rear surface side of the main mirror 201, and is guided to a focus detection unit 207.

Meanwhile, the light flux reflected by the main mirror 201 forms an image on a focus plate 203 arranged at a position that is optically conjugate with an image sensor 209. This light flux is diffused by the focus plate 203, and the light that passes through the focus plate 203 (subject image) is converted into an erected image by a roof pentaprism 204. The erected image is enlarged by an eyepiece 205, and the resulting image can be observed by the user.

Also, when the main mirror 201 is mirrored-up to the second position, the sub mirror 202 is also folded along with the main mirror 201 so as to be retracted outside the imaging light path. Accordingly, the light flux from the imaging lens 100 passes through a focal plane shutter 208, which is a mechanical shutter, and arrives at the image sensor 209. The focal plane shutter 208 limits the amount of light that is incident on the image sensor 209. The image sensor 209 is configured to include, for example, a photoelectric conversion element, such as a CCD sensor or a CMOS sensor, that performs photoelectric conversion on the subject image formed by the imaging lens 100 and outputs the resulting electrical signal.

Also, a camera CPU 210 is a controller that controls various types of calculations and various types of operations in the image capturing apparatus 200. The CPU 210 performs overall control of the image capturing apparatus 200, and controls the operation of various circuits and the like. The CPU 210 performs communication with a lens control circuit 103 in the imaging lens 100 via the electrical contact unit 104. A lens driving mechanism 102 has a stepping motor as a driving source, and drives the focus lens 101 in the optical axis direction. In accordance with a control signal from the CPU 210, the lens control circuit 103 controls the lens driving mechanism 102 to drive the focus lens 101, thereby performing focus adjustment.

Also, the CPU 210 is also connected to an EEPROM 211 in which camera ID (identification) information, which is unique information for individually identifying the image capturing apparatus 200, and adjustment values for parameters related to imaging, and so forth, are stored.

A display unit 212 is an apparatus for displaying image data of images captured by the image sensor 209 and displaying items set by the user, and is generally configured by a color liquid crystal display element.

Furthermore, a counter 214 and an operation detection unit 213 that detects operations performed by the user on the image capturing apparatus 200 are connected to the CPU 210. Specifically, the operation detection unit 213 detects an operation performed on a release button (not shown), and on an operation unit (not shown), including a select button, and a button allowing the selection of one image from among images obtained by later-described bracket imaging, and so forth. The counter 214 is a counter for counting the number of shots when performing bracket imaging. The counter value of the counter 214 is reset by the CPU 210.

Meanwhile, the lens control circuit 103 of the imaging lens 100 is provided with a memory (not shown) that stores property information such as the full-open aperture value and the focal length of the imaging lens 100, and lens ID (identification) information, which is unique information for identifying the imaging lens 100. The memory also stores information received by communication from the CPU 210. Note that the property information and the lens ID information are transmitted to the CPU 210 by initial communication at the time of mounting to the image capturing apparatus 200, and the CPU 210 stores this information in the EEPROM 211.

Figure 3:
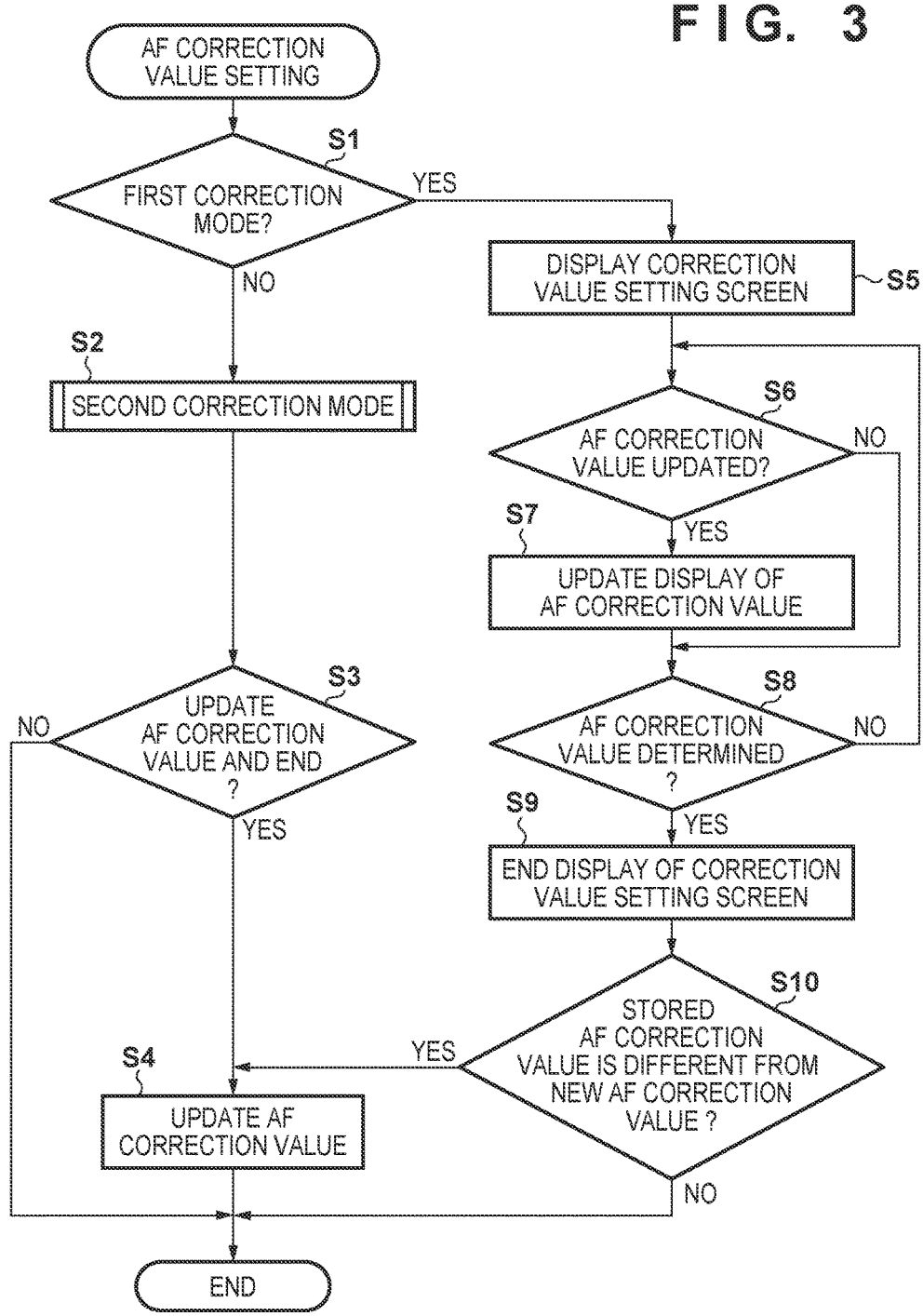
FIG. 3 is a flowchart showing AF correction value setting processing according to an embodiment.

FIG. 3 is a flowchart showing AF correction value setting processing according to the present embodiment. AF correction value setting processing is controlled by the CPU 210 in this embodiment. Further, AF correction value setting processing may be performed by at least one circuitry or by the CPU 210 and a circuitry. The image capturing apparatus 200 according to the present embodiment has an AF micro adjustment function. In the present embodiment, it is possible to select either a first correction mode in which the user performs AF micro adjustment for setting a desired AF correction value or a second correction mode in which the AF correction value is obtained using micro adjustment support (MAS). Details of AF micro adjustment and the processing using MAS will be described later.

Note that, in the present invention and specification, the term "in-focus position", when simply referred, indicates an in-focus position obtained by the focus detection unit 207 of the focus control apparatus by performing focus detection, and does not indicate an actual in-focus position or a position that the user thinks to be an in-focus position. Similarly, the term "defocus amount", when simply referred, indicates a defocus amount obtained by the focus detection unit 207 of the focus control apparatus by performing the focus detection, that is a shift amount of the focus position with respect to the in-focus position on the optical axis detected by the focus detection unit 207.

Figure 2:
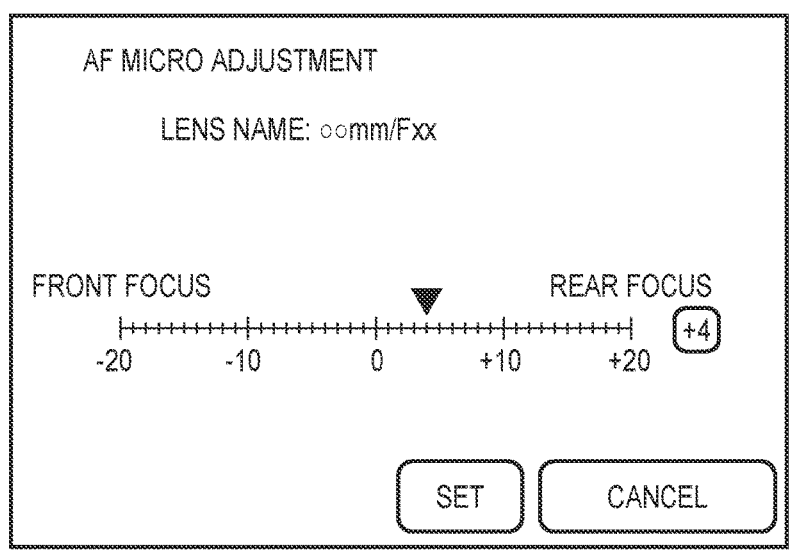
FIG. 2 is a diagram showing an example of a correction value setting screen used in AF micro adjustment according to an embodiment.

First, in step S1, it is determined whether or not a user selected the first correction mode. If the first correction mode has been selected, the procedure moves to step S5, and if the first correction mode has not been selected, the procedure moves to step S2. In step S5, a correction value setting screen for performing AF micro adjustment is displayed on the display unit 212. FIG. 2 is a diagram showing an example of the correction value setting screen.

AF micro adjustment is processing in which the user determines, based on a captured image, the amount and direction of shift between the actual in-focus position and the in-focus position that is based on the defocus value detected by the focus detection unit 207, and the user directly sets the AF correction value. As shown in FIG. 2, with AF micro adjustment in the present embodiment, the user can set the AF correction value to a desired value in increments of one tick mark in the range of ±20 tick marks, and the in-focus position that is based on the defocus value can be shifted by an amount corresponding to the AF correction value that was set. The amount of focus correction on the AF correction value for each tick mark is assumed to be $(1/16) \times F\delta$ (F: aperture F of imaging lens, δ: diameter of permissible circle of confusion) in the present embodiment, but there is no limitation to this in the present invention, and this focus correction amount per tick mark can be changed as necessary according to the properties of the imaging lens 100 and the image capturing apparatus 200.

In FIG. 2, 0 is the reference position set as a factory default in the image capturing apparatus 200. In the correction value setting screen shown in FIG. 2, the black triangle pointer indicates the AF correction value stored in the EEPROM 211, and the user can change the AF correction value by performing an operation for moving the black triangle pointer along the scale.

In step S6, it is determined whether or not an operation for changing the AF correction value was performed by the user using the correction value setting screen. If an operation for changing the AF correction value was performed, the procedure moves to step S7, and if an operation for changing the AF correction value has not been performed, the procedure moves to step S8.

In step S7, the display of the correction value setting screen is updated in accordance with the user operation. Here, in the correction value setting screen shown in FIG. 2, the black triangle pointer is displayed at a position that corresponds to the user operation.

In step S8, it is determined whether or not the user determined an AF correction value. Here, it is determined whether or not a "set" button was selected in the correction value setting screen shown in FIG. 2. If the "set" button was not selected, the procedure returns to step S6, and the above processing is repeated. However, if the "set" button was selected, and an AF correction value is determined, the procedure moves to step S9, in which the display of the correction value setting screen is ended, and then the procedure moves to step S10. Although it is not shown in FIG. 3, when a "cancel" button in FIG. 2 was selected, the subsequent processes are not performed, and AF correction value setting processing is ended.

In step S10, it is determined whether or not the AF correction value that was stored in the EEPROM 211 when the first correction mode was selected is different from the new AF correction value that was set by the processing from step S6 to step S8. If these two values are different, the procedure moves to step S4, in which the AF correction value is updated, and if the value has not been changed, AF correction value setting processing is ended.

On the other hand, if the first correction mode has not been selected in step S1, an AF correction value is calculated using MAS in the second correction mode in step S2. In the second correction mode that uses MAS, multiple images are captured while driving the position of the focus lens 101 a predetermined very small amount and detecting defocus values, the image determined by the user to be the most in-focus is selected from among the obtained images, and an AF correction value is obtained based on the defocus value of the selected image. Note that details of the processing performed in step S2 will be described later. When the AF correction value has been calculated, the procedure moves to step S3.

In step S3, it is determined whether or not the AF correction value stored in the EEPROM 211 is to be updated to the AF correction value that was calculated in step S2. If the AF correction value is to be updated, the procedure moves to step S4, whereas if not, AF correction value setting processing is ended.

In step S4, the AF correction value is updated by storing the AF correction value that was obtained by the processing of step S2 or the processing from step S6 to step S10 in the EEPROM 211, and when this updating ends, AF correction value setting processing is ended.

As described above, the AF correction value stored in the EEPROM 211 is used to correct the lens drive amount during AF that is based on the defocus value detected by the focus detection unit 207 (focus detection result), using Equation (1) below.

$$\text{lens drive amount} = \text{defocus value} + \text{adjustment value} + \text{AF correction value} \quad (1)$$

Note that in Equation (1), the adjustment value indicates data for adjusting the defocus value set at the time of manufacturing.

Figure 4A:
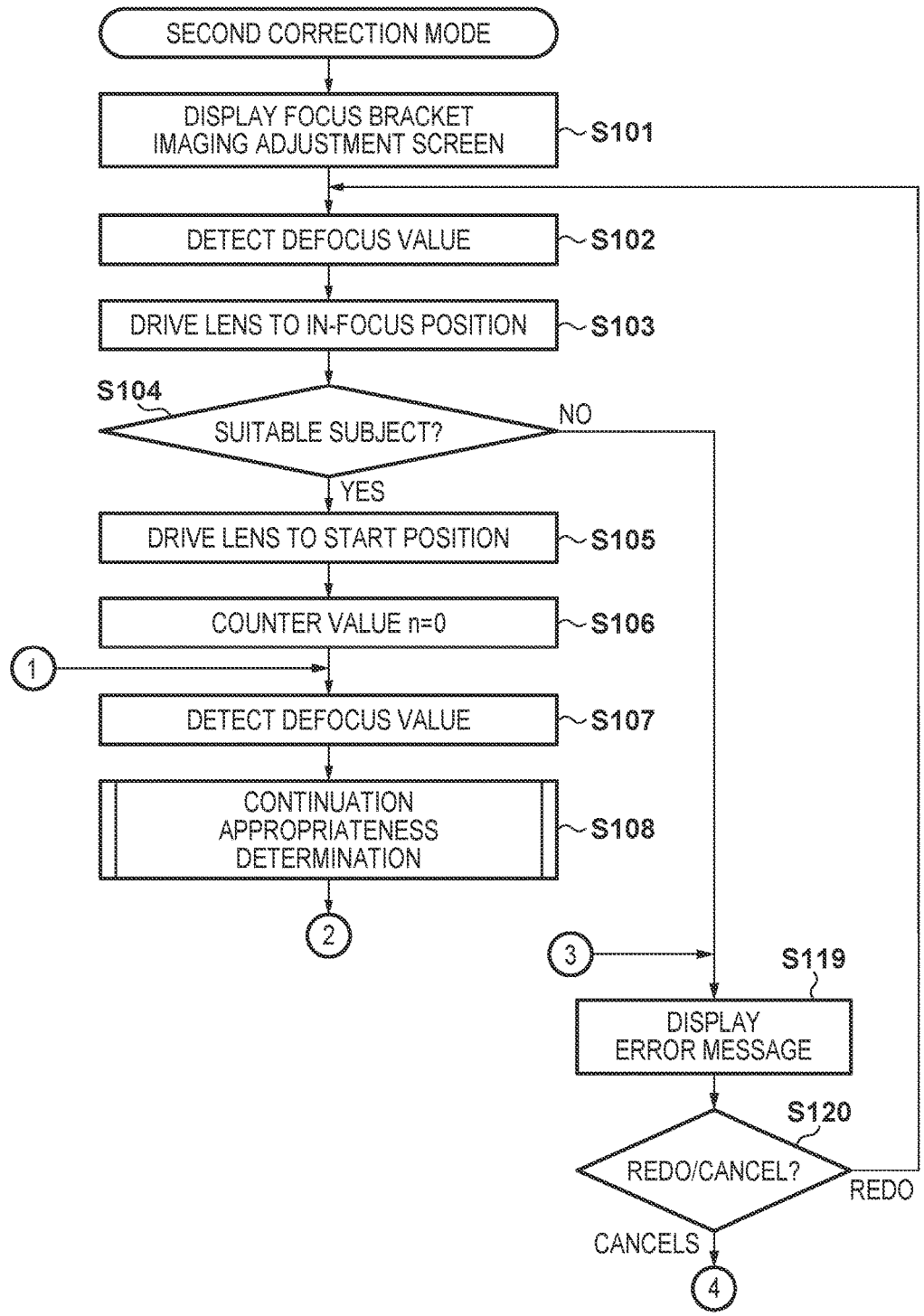
FIGS. 4A and 4B are flowcharts showing AF correction value setting processing that uses MAS according to a first embodiment.
Figure 4B:
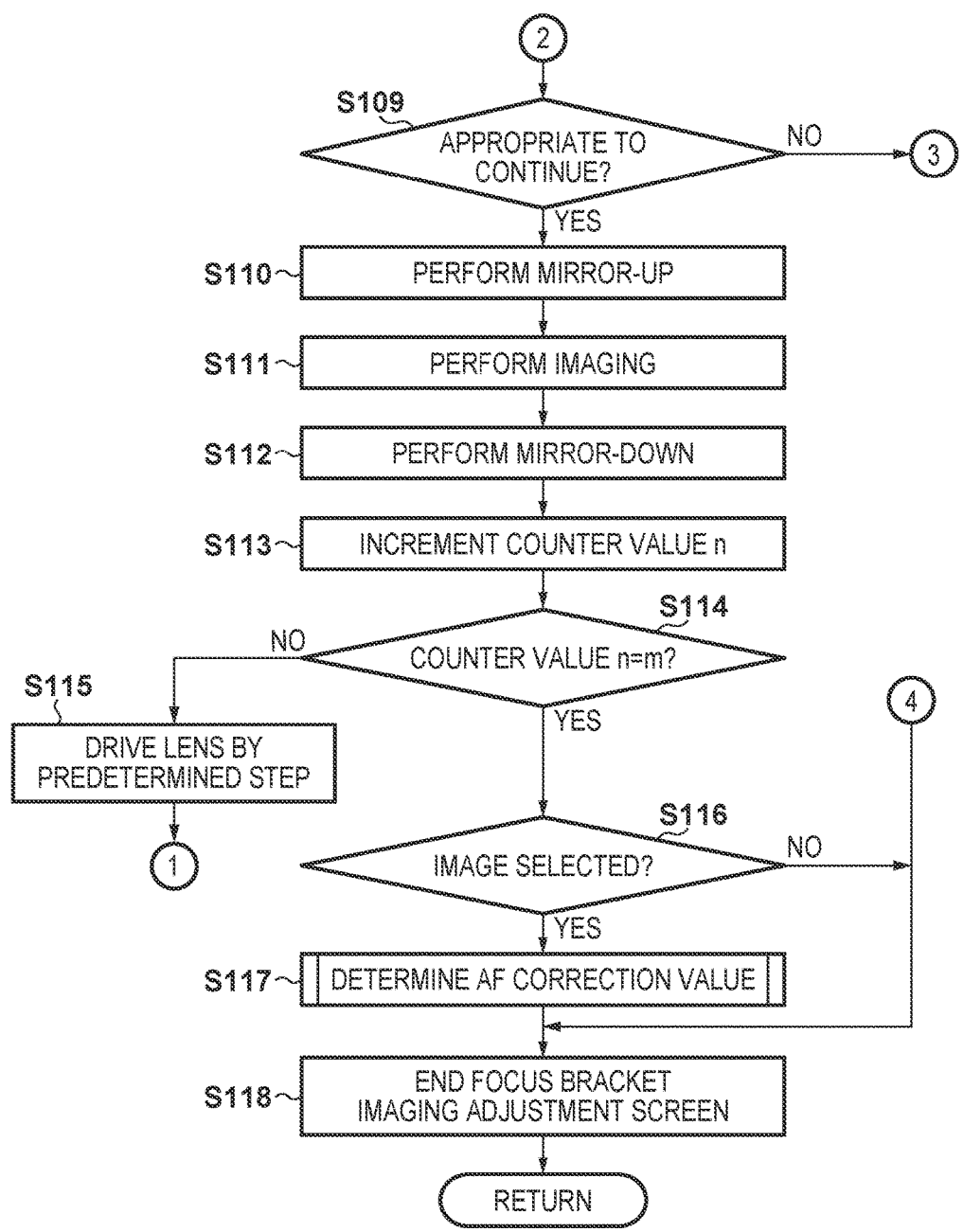

Next, the processing performed in step S2 to set the AF correction value using MAS in the second correction mode will be described with reference to the flowchart in FIGS. 4A and 4B.

First, in step S101, a focus bracket imaging adjustment screen is displayed on the display unit 212. The content displayed here is, for example, an operation instruction for the user. When the adjustment screen has been displayed, the procedure moves to step S102. In step S102, the focus detection unit 207 detects the defocus value for the subject that is to be used in the calculation of the AF correction value of the imaging lens 100. Since a defocus value contains a detection error, in order to increase the precision, a defocus value is detected a plurality of times and an average of the detected defocus values is determined as a final defocus value in step S102. When the detection of the defocus value ends, the procedure moves to step S103, in which the focus lens 101 is driven to a lens position that corresponds to the defocus value that was detected (in-focus position). When the driving of the focus lens 101 ends, the procedure moves to step S104.

In step S104, it is determined whether or not the subject that is focused by the processes of steps S102 and S103 is a subject that is suited to the calculation of the AF correction value. Here, for example, the focus detection unit 207 calculates an AF reliability evaluation value for the subject based on a signal received by a focus detection sensor (not shown) that is provided in the focus detection unit 207. This is performed because the focus detection precision of the focus detection unit 207 decreases if the subject is dark or has low contrast, and therefore the AF reliability evaluation value is given a low value in a case where the focus detection precision may decrease. Then, it is determined whether or not the subject is suitable based on the AF reliability evaluation value that was obtained. If the subject is suitable, the procedure moves to step S105, and if the subject is not suitable, the procedure moves to step S119.

In step S105, the lens is driven to the focus bracket start position near a lens position corresponding to the detected defocus value (in-focus position). Letting s be the lens driving step each time imaging is performed, and m be the number of shots, the focus bracket start position is on the close end side at a position $(m-1) \times s/2$ away from the in-focus position that was calculated based on the defocus value.

In step S106, a counter value n of the counter 214 is reset. This counter value n is associated with the number of focus bracket shots, and is set to 0 before the start of focus bracket imaging, and thereafter the procedure moves to step S107.

In step S107, the focus detection unit 207 performs defocus value detection. The defocus value detected here is ultimately stored in the EEPROM 211 (defocus value storage area) in association with the image that is captured in step S109. As the defocus value contains a detection error, in order to improve the precision, the defocus values are detected a plurality of times. When the detection of the defocus value ends, the procedure moves to step S108.

In step S108, continuation appropriateness of setting the AF correction value using MAS is determined based on the defocus value detected in step S107. Details of determination of the continuation appropriateness will be described later. After the determination of the continuation appropriateness ends, the procedure moves to step S109.

In step S109, whether or not continuation of the AF correction value setting processing using MAS is possible is checked in accordance with the continuation appropriateness determination in step S108. If possible, the procedure moves to step S110, whereas if not possible, the procedure moves to step S119.

In step S110, prior to imaging in step S111, mirror-up is performed such that the main mirror 201 and the sub mirror 202 move to the second position so as to be retracted outside the imaging light path. When mirror-up ends, the procedure moves to step S111. In step S111, imaging is performed, and the obtained image is stored in association with the defocus value that was detected in step S107. When imaging ends, the procedure moves to step S112, in which mirror-down is performed such that the main mirror 201 and the sub mirror 202 move to the first position in the above-described imaging light path. When mirror-down ends, the procedure moves to step S113.

In step S113, the counter value n that indicates the number of shots is incremented, and then the procedure moves to step S114. In step S114, it is determined whether or not the counter value n has reached the number of shots m. If the counter value n has not reached the number of shots m, the procedure moves to step S115, and if it has reached the number of shots m, the procedure moves to step S116. In step S115, the focus lens 101 is driven toward infinity by the lens driving step s, and when lens driving ends, the procedure moves to step S107. By repeating the processing from step S107 to step S115, m images having different focus states by the lens driving step s are captured consecutively.

In step S116, the user selects one best-focused image in which the focus appears to be the most appropriate, from among the m images having different focus states by the lens driving step s.

At this time, the images obtained by the focus bracket imaging are displayed on the display unit 212. The images for display may be displayed one at a time, or may be displayed side-by-side. The user operates an operation member (not shown) while checking the images displayed on the display unit 212, selects the image having the best in-focus state, and then determines the selection. If it is difficult to identify which image is in the in-focus state among the images, the user may be allowed to select multiple images. For example, if the user has determined that the in-focus state is between two images that were obtained by focus bracket imaging, it is possible to select two images.

Also, it is not necessarily required to select an image in step S116, and if, for example, the selection of the best-focused image is difficult, and an image has not been selected for a predetermined time, AF correction value setting processing has been canceled by a predetermined operation, or the like, the procedure moves to step S118. On the other hand, if one best-focused image has been selected, the procedure moves to step S117.

In step S117, the AF correction value is calculated based on the defocus value that is associated with the image that was selected by the user in step S116. Details of the AF correction value determination process will be explained later. When the calculation of the AF correction value is complete, the procedure moves to step S118. In step S118, the display of the focus bracket imaging adjustment screen is ended, and the calculation of the correction value in the second correction mode ends.

If it is determined in step S104 that the subject was not suitable, or if it is determined in step S109 that the continuation of the AF correction value setting processing using MAS is not possible, the procedure moves to step S119, in which an error message (indicating the fact that an error occurred and the probable cause of the error) is displayed on the display unit 212. When the display is complete, the procedure moves to step S120, in which an instruction to redo or cancel adjustment is received from the user. In the case of redoing adjustment, the procedure returns to step S102, and in the case of canceling adjustment, the procedure moves to step S118.

Next, the continuation appropriateness determination processing performed in step S108 will be explained with reference to a flowchart of FIG. 5.

In step S201, an AF correction value is calculated based on the defocus value detected in step S107. Here, the AF correction value is determined on the basis of an average of defocus values detected plurality of times in step S107. After the AF correction value is calculated, the procedure moves to step S202.

In step S202, reliability of the AF correction value calculated in step S201 is calculated based on a variation (standard deviation) of the defocus values detected plurality of times in step S107. More specifically, a reciprocal of the standard deviation of the defocus values is used as the reliability of the AF correction value. The larger the variation of the detected defocus values is, the lower the reliability of the AF correction value calculated in step S201 is, and the smaller the variation of the detected defocus values is, the higher the reliability of the AF correction value calculated in step S201 is. Thus, since the reliability of the AF correction value is obtained based on the defocus values obtained by focus detection, it can be said that the reliability of the AF correction value is the reliability of the defocus values obtained by focus detection. After the calculation of the reliability of the AF correction value ends, the procedure moves to step S203.

In step S203, it is determined whether or not the reliability of the AF correction value calculated in step S202 is higher than a first threshold. The first threshold is set lower than second, third, and fifth thresholds that will be explained later. In a case where the reliability of the AF correction value is equal to or lower than the first threshold, it is determined that the environment under which the AF correction value setting processing using MAS is carried out is inappropriate (for example, an object moved greatly during detecting the defocus values, and so forth), the procedure moves to step S208 in which it is determined that it is inappropriate to continue. By contrast, in a case where the reliability of the AF correction value is higher than the first threshold, the procedure moves to step S204.

In step S204, it is determined whether or not the reliability of the AF correction value calculated in step S202 is higher than the second threshold. The second threshold is set higher than the first threshold. In a case where the reliability of the AF correction value is higher than the second threshold, the procedure moves to step S205, whereas if not, the procedure moves to step S209.

In step S205, it is determined whether or not the reliability of the AF correction value calculated in step S202 is higher than the third threshold. The third threshold is set higher than the first threshold, and equal to or higher than the second threshold. In a case where the reliability of the AF correction value is equal to or lower than the third threshold, the procedure moves to step S209.

In step S209, it is determined whether or not the counter value n is 1. Even if the reliability is equal to or lower than the second or third threshold, if the reliability of the AF correction value of the images shot before and after the currently processed image is high, it is possible to recalculate the AF correction value of the target image based on the AF correction values of other images without using the AF correction value calculated in step S201. However, in a case where the reliability of the first image is equal to or lower than the second or third threshold, since information necessary for recalculating the AF correction value of the first image is not obtained, and it is difficult to recalculate the AF correction value of the first image. Accordingly, if the counter value n is 1, then the procedure moves to step S208 in which it is determined that it is inappropriate to continue. If the counter value n is not 1, then the procedure moves to step S210.

In step S210, it is judged whether or not the counter value n is m−1. In a case where the reliability of the m-th image is equal to or lower than the third threshold, since information necessary for recalculating the AF correction value of the (m−1)th image is not obtained, it is difficult to recalculate the AF correction value of the m-th image. Accordingly, in a case where the counter value n is m−1, the procedure moves to step S208 in which it is determined that it is inappropriate to continue. In a case where the counter value n is not m−1, the procedure moves to step S211.

In step S211, it is determined whether or not the reliability of the AF correction value of an image, captured one shot before the image for which the reliability of the AF correction value is calculated in step S202, namely, the image that is captured when the focus lens 101 is at a position on the close end side by the lens driving step s, is higher than the second threshold. In a case where the reliability of the AF correction value of the image captured one shot before is equal to or lower than the second threshold, it is determined that reliability of information necessary for recalculation of the AF correction value is insufficient, and the procedure moves to step S208 in which it is determined that it is inappropriate to continue. On the other hand, in a case where the reliability of the AF correction value of the image captured one shot before is higher than the second threshold, the procedure moves to step S207 in which it is determined that it is appropriate to continue.

In a case where it is determined in step S205 that the reliability of the AF correction value is higher than the third threshold value, the procedure moves to step S206. In step S206, it is determined whether the reliability of the AF correction value of the image captured one shot before the image for which the reliability of the AF correction value is calculated in step S202 is higher than the third threshold. If the reliability of the AF correction value of the image captured one shot before is higher than the third threshold, the procedure moves to step S207, in which it is determined that it is appropriate to continue the AF correction value setting processing using MAS. Whereas, if not, the procedure moves to step S212.

In step S212, it is checked whether or not a difference between the AF correction value of the currently processed image and the AF correction value of an image captured two shots before is less than a fourth threshold. In a case where the reliability of the AF correction value of the image captured one shot before is equal to or less than the third threshold, the defocus values associated with the currently processed image are not reliable, and thus it is necessary to recalculate the AF correction value based on the AF correction value of an image other than the currently processed image. If the difference between the AF correction value of the currently processed image and the AF correction value of an image captured two shots before is equal to or greater than the fourth threshold, there is a possibility that the lens may have not moved as designed while capturing the two images, and thus there is a possibility that an incorrect AF correction value is obtained by recalculating the AF correction value of an image captured one shot before. Accordingly, if the difference between the AF correction value of the currently processed image and the AF correction value of an image captured two shots before is equal to or greater than the fourth threshold, the procedure moves to step S213 in which it is determined that it is inappropriate to continue, whereas, if the difference is less than the fourth threshold, the procedure moves to step S207 in which it is determined that it is appropriate to continue.

In this manner, in a case where images having reliability that is equal to or lower than the second or third threshold are successively captured for a predetermined number of times (two in series in the processes in step S201 to S213), it is determined that it is inappropriate to continue. Further, in a case where an image having reliability that is equal to or lower than the third threshold and the difference between the correction values of the images captured one shot before and after the currently processed image is equal to or greater than the fourth threshold, it is determined that it is inappropriate to continue. By doing so, it is possible to appropriately notify the user that the environment (object, location, and so forth) is not suitable for adjustment.

Figure 6:
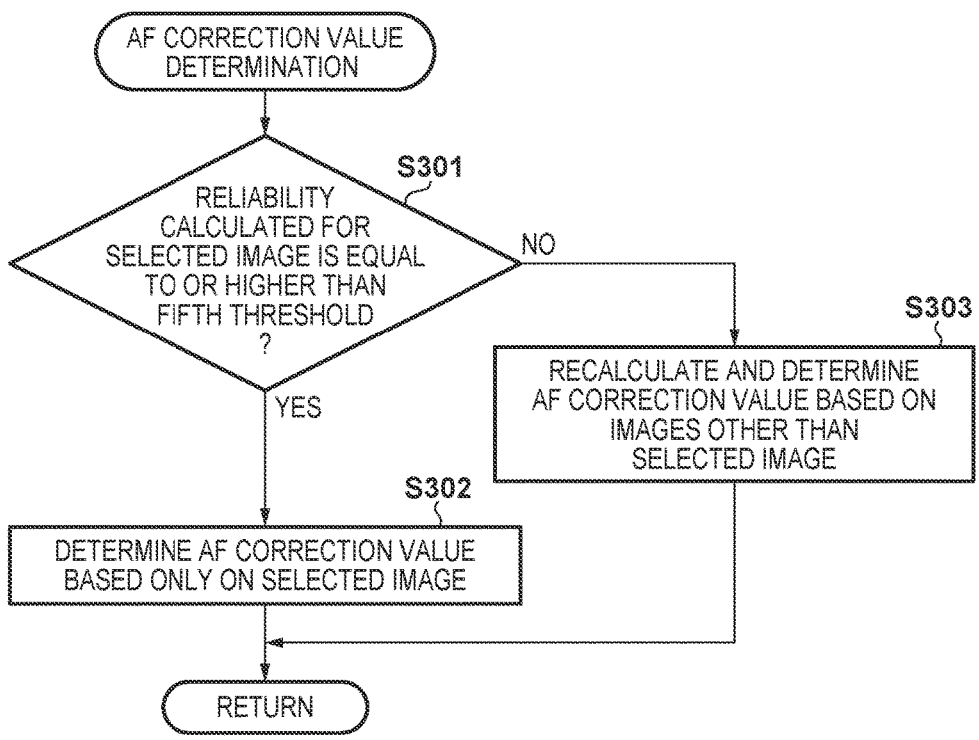
FIG. 6 is a flowchart showing AF correction value determination processing according to the first embodiment.

Next, the AF correction value determination processing performed in step S117 will be explained with reference to a flowchart of FIG. 6. In step S301, it is determined whether or not the reliability of the AF correction value of the image selected in step S116 is equal to or higher than the fifth threshold value. If yes, the procedure moves to step S302, whereas if no, the procedure moves to step S303.

In step S302, the AF correction value is determined based only on the selected image. In other words, in a case where the reliability of the AF correction value of the image selected by the user is equal to or higher than the fifth threshold value, it is considered that the reliability of the AF correction value of the image is sufficiently high, and the AF correction value is determined using only the selected image. Namely, the AF correction value calculated in step S201 is determined as the AF correction value obtained by using the MAS.

In step S303, the AF correction value of the selected image is recalculated (re-obtained) using the AF correction values of images other than the selected image. In other words, in a case where the reliability of the AF correction value of the user selected image is lower than the fifth threshold, it is considered that the reliability of the AF correction value of the user selected image is insufficient, and the AF correction value of the user selected image is recalculated using the AF correction values of images other than the user selected image. By performing the processes of steps S201 to S213, it is possible to calculate a reliable AF correction value if the AF correction value is recalculated using the AF correction values of the images other than the user selected image.

For example, the AF correction value is calculated from an average of AF correction values of images of defocus states in which the focus lens 101 is at a position on the close end side and at a position on the infinity end side by the lens driving step s with respect to the position of the focus lens 101 when the user selected image is captured.

As another example, the AF correction value may be calculated by approximating the defocus state of the imaging lens at the time of image capturing and the AF correction value using AF correction values of a plurality of images which are not selected by the user. For example, with respect to a plurality of images that are not selected by the user, relationship between the numbers of a plurality of images captured by focus bracket imaging and the AF correction values associated with the images, respectively, are linearly approximated, and the AF correction value of the user selected image may be recalculated using the approximated relationship.

Alternatively, an AF correction value changing amount of each image that is assumed due to design may be used. For example, the AF correction value of the user selected image may be calculated by adding a designed AF correction value changing amount, that occurs by driving the focus lens 101 by the lens driving step s, to the AF correction value of an image of a defocus state captured when the focus lens 101 is at a position on the close end side by the lens driving step s from a position of the focus lens 101 when the user selected image is captured.

Figure 5:
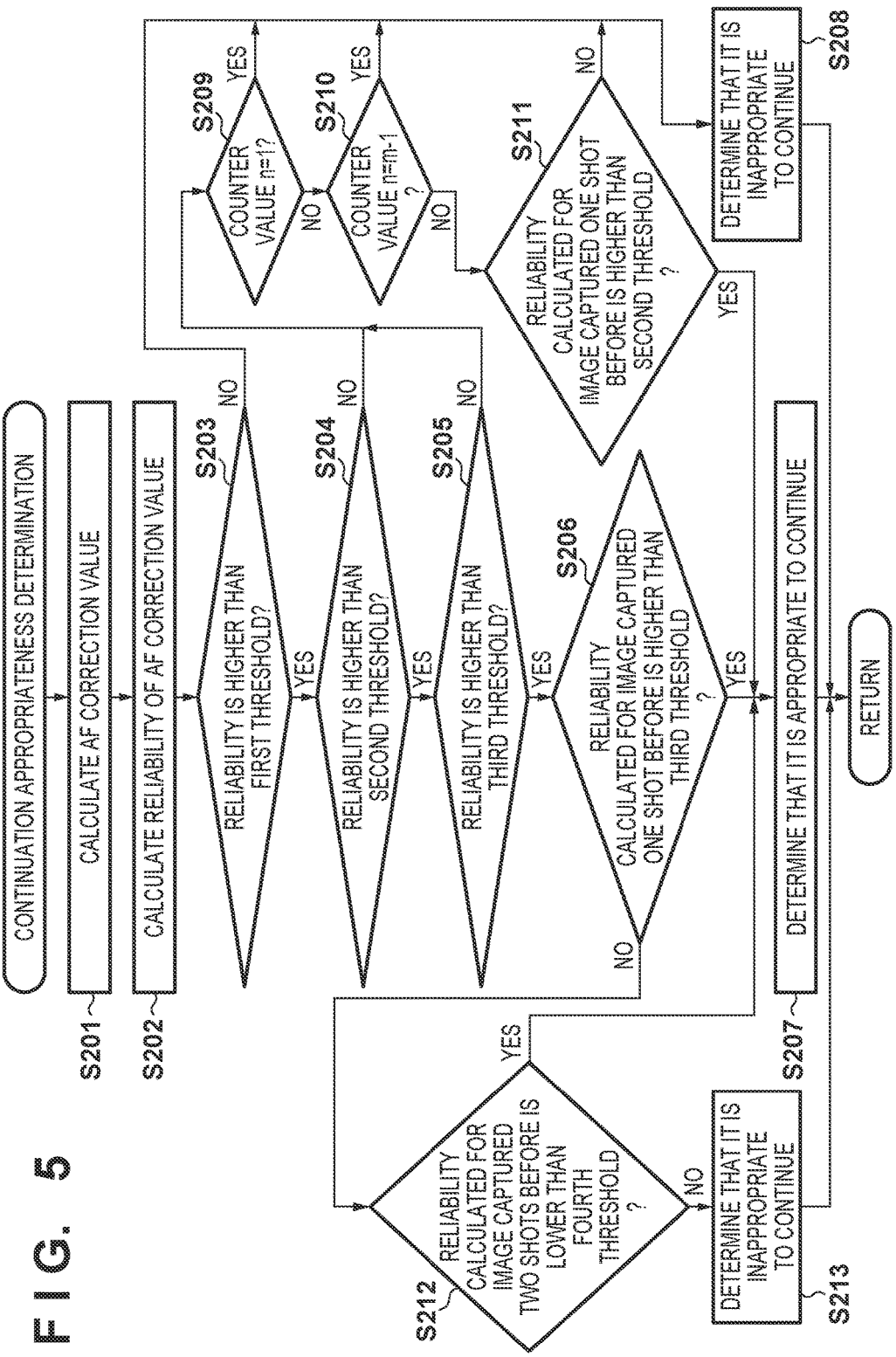
FIG. 5 is a flowchart showing continuation appropriateness determination processing according to the first embodiment.

It should be noted that in order to recalculate the AF correction value from the average of the AF correction values of images captured before and after the user selected image, it is necessary to perform the processes in steps S209 and S210 in FIG. 5; however, in a case where the AF correction value is recalculated using other method, the processes in steps S209 and S210 may be skipped.

According to the first embodiment as described above, it is possible to calculate an AF correction value more accurately even in a case where a defocus value includes a detection error.

Second Embodiment

Next, the second embodiment of the present invention will be explained. In the second embodiment, in a AF correction value setting processing using MAS in the second correction mode, the process performed in step S107 in FIG. 4A is different from that performed in the first embodiment. Since the other processes are the same as those described in the first embodiment, a difference will be explained below.

Figure 7:
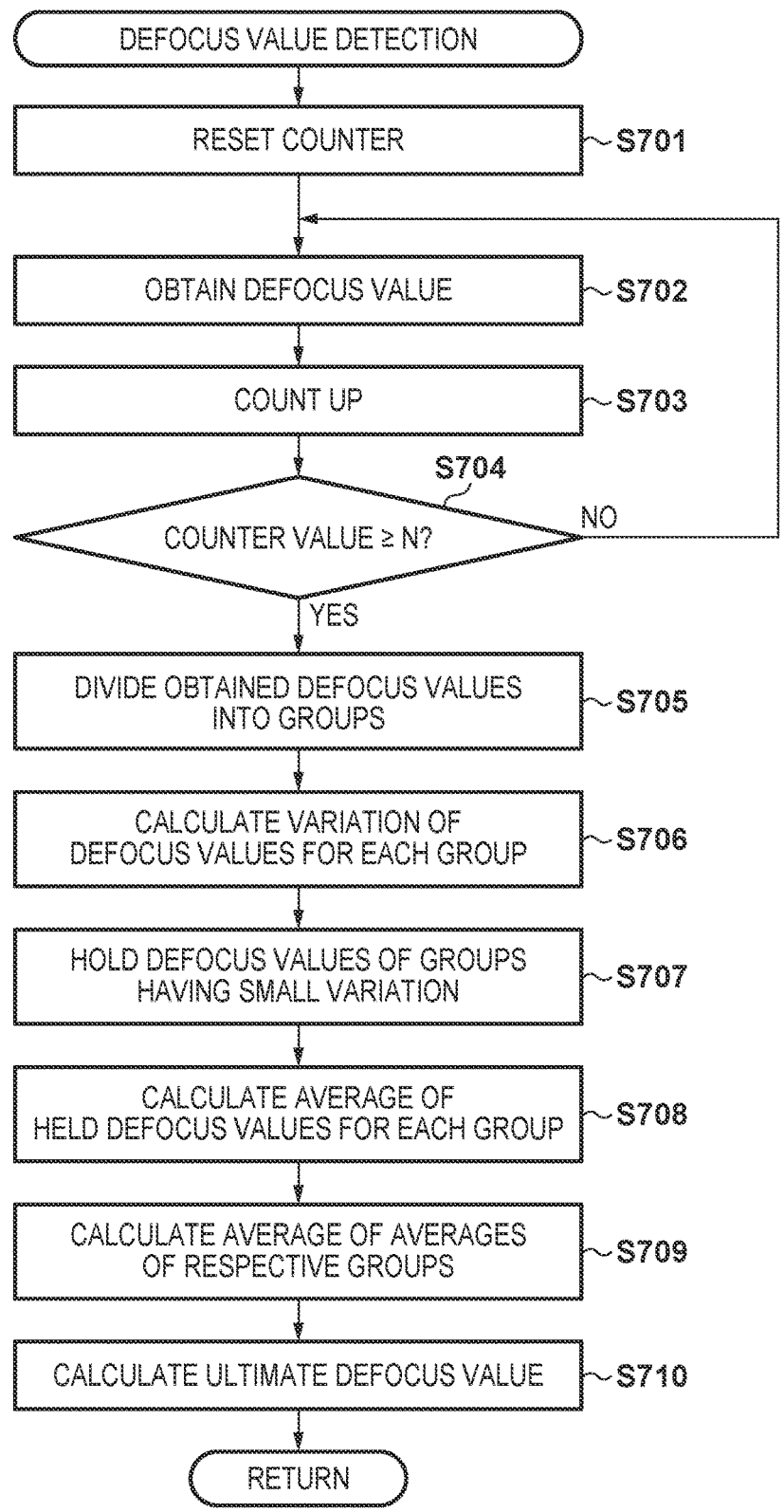
FIG. 7 is a flowchart showing defocus value detection processing according to a second embodiment.

FIG. 7 is a flowchart showing defocus value detection processing performed in step S107. When acquisition of a defocus value starts, in step S701, a counter for counting the number of acquired defocus values is reset, and the procedure moves to step S702.

In step S702, a defocus value showing a current focus state of the subject is obtained, and the procedure moves to step S703 with holding the obtained defocus value. In step S703, the counter is incremented by one, and the procedure moves to step S704.

In step S704, whether or not the counter value, or the number of acquired defocus values, is equal to or greater than a predetermined value N. If the number of acquired defocus values is less than the predetermined value N, then the procedure returns to step S702, in which acquisition of a defocus value is performed again. If the number of acquired defocus values is equal to or greater than the predetermined value N, then the procedure moves to step S705.

In step S705, the plurality of acquired defocus values are grouped into a plurality of groups, then the procedure moves to step S706. The grouping method in this case includes grouping the defocus values by a predetermined number, and grouping the defocus values so that the number of groups becomes a predetermined number by adjusting the number of defocus values in each group.

In step S706, for each group of the defocus values divided into a plurality of groups, variation of the defocus values are obtained using a statistical technique, and the procedure moves to step S707. As the variation, a 3σ value may be obtained as the standard deviation of the defocus values, or other evaluation value may be obtained. In step S707, the variation of the defocus value calculated for each group is judged, and a group (singular value) having a variation larger than a predetermined value is excluded, and defocus values of groups having variation equal to or less than the predetermined value are held, and the procedure moves to step S708.

In step S708, for each group of which the defocus values are held, an average value of the defocus values is obtained, and the procedure moves to step S709. In step S709, from the average of the defocus amounts obtained for each group in step S708, an average value of all of the defocus values are obtained, then the procedure moves to step S710.

In step S710, it is determined whether or not a difference (accurately, an absolute value of a difference) between the average value of all of the defocus values and the average value of the defocus values of each group that are held in step S707 is equal to or less than a predetermined value. Then, a group/groups having the difference greater than the predetermined value (singular value) is/are excluded, an average value is obtained from the defocus values of groups having the difference equal to or less than the predetermined value, and the obtained average value is determined as an ultimate defocus value (representative value), then the procedure returns to main routine.

Figure 8A:
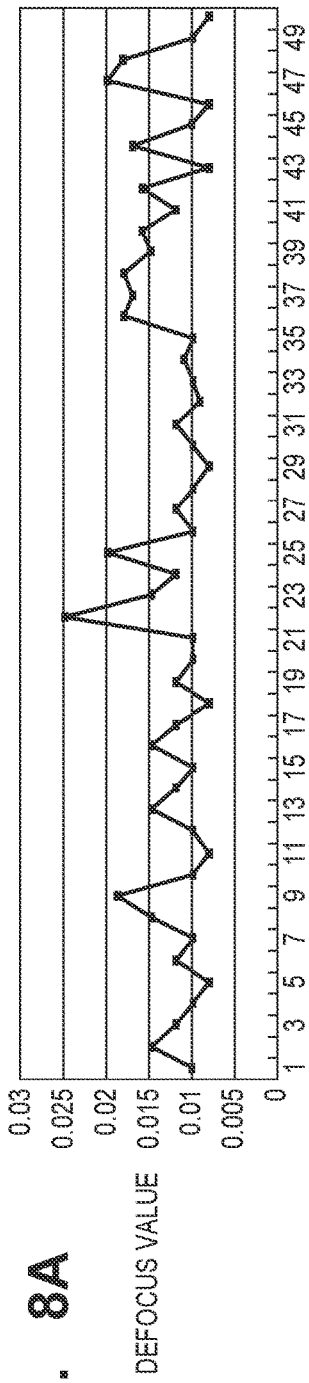
FIGS. 8A to 8C are diagrams showing grouping of defocus values according to the second embodiment.
Figure 8B:
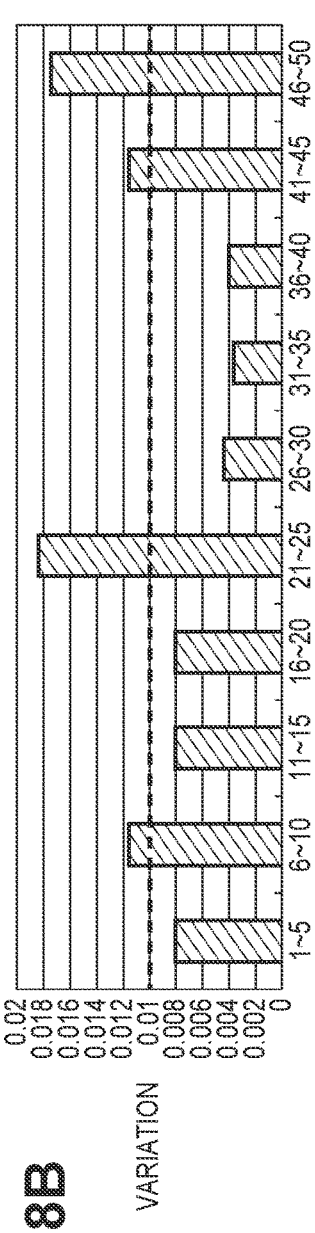
Figure 8C:
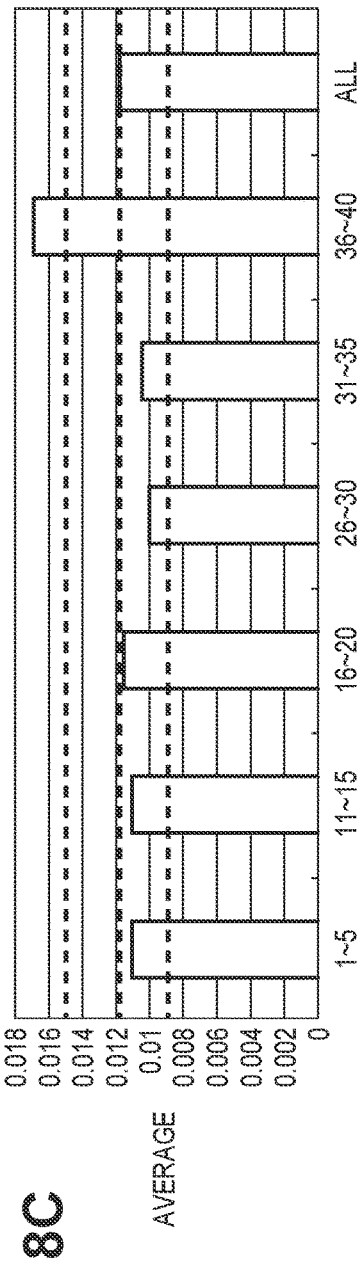

FIGS. 8A to 8C are diagrams for explaining grouping of obtained defocus values. In the example shown in FIGS. 8A to 8C, 50 defocus values are obtained, and divided into ten groups, each contains five defocus values.

FIG. 8A shows the obtained 50 defocus values. In FIG. 8B, the obtained 50 defocus values are divided into ten groups, each contains five defocus values (S705), and variation is obtained for each divided group (S706). In the four groups of 6-10, 21-25, 41-45, and 46-50, the variation of the defocus values exceeds a predetermined value (0.01, in the example of FIG. 8B). Therefore, these four groups are excluded for calculating the ultimate defocus value (S707).

FIG. 8C shows that an average of the defocus values is obtained for each of the remaining six groups (S708). Then, among the six groups, a group/groups having the average that differs from an average of the averages of the six groups (S709) by a predetermined value or more is/are excluded from the calculation of the ultimate defocus value, and the ultimate defocus value is calculated using the defocus values of the remaining groups. In the example shown in FIG. 8C, the group of 36-40 having an average that is different form the average of the six groups by the predetermined value or more is excluded (S710). Accordingly, in the example shown in FIGS. 8A to 8C, the ultimate defocus value is obtained from the data of the five groups of 1-5, 11-15, 16-20, 26-30, and 31-35.

Here, in the example described above, the data used for obtaining the ultimate defocus value is half of the initially obtained data. This indicates that the detection of the defocus values is performed under an unstable condition, and depending on an amount of the excluded data, the reliability of the calculated defocus value can be set. The fact that the amount of the excluded data is large indicates that variation of the defocus values was large. Since the number of defocus values used for calculation is small, the reliability of the ultimate defocus value is set low.

Further, in a case where the reliabilities of a calculated defocus value that is associated with an image captured in focus bracketing imaging is low, the defocus values may be weighted in accordance with the reliabilities of the defocus values calculated for images captured one shot before and after the image, and a defocus value of the image may be calculated by interpolation.

Note that, in the example shown in FIGS. 8A to 8C, the obtained 50 defocus values are divided into the ten groups each having five defocus values, however, the number of obtained defocus values, the number of defocus values in each group, or the number of groups are not limited to those described above. Further, it shows a case in which the obtained defocus values are used once upon grouping, however, the defocus values may be grouped such that a defocus value belongs to a plurality of groups such that first to tenth defocus values are grouped into the first group, sixth to fifteenth defocus values are grouped into the second group, and so on.

According to the second embodiment as described above, it is possible to obtain the defocus value under a state in which a singular point of the defocus values is excluded, therefore, it is possible to calculate an AF correction value more accurately.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-250496, filed on Dec. 22, 2015 which is hereby incorporated by reference herein in its entirety.

What is claimed is:

1. An focus control apparatus comprising:
    a focus detection unit that detects a defocus value;
    a control unit that controls focus position adjustment using the defocus value;
    a first acquisition unit that acquires reliability of the defocus value;
    a storage unit that stores a plurality of images captured by an image sensor at a plurality of focus positions including an in-focus position based on the defocus value detected by the focus detection unit, and the defocus value detected for each of the plurality of images by the focus detection unit in association with each of the plurality of images; and
    a second acquisition unit that, in a case where the reliability of the defocus value corresponding to a selected image from among the plurality of images is lower than a first threshold, acquires a first correction value to be used for correcting the focus position adjustment based on the defocus values of a plurality of unselected images among the plurality of images,
    wherein the control unit adjusts the focus position using the first correction value in a case where the reliability of the defocus value corresponding to the selected image is lower than the first threshold.

2. The focus control apparatus according to claim 1, wherein in a case where the reliability of the defocus value corresponding to the selected image is equal to or higher than the first threshold,
    the second acquisition unit acquires a second correction value to be used for correcting the focus position adjustment based on the defocus value corresponding to the selected image from among the plurality of images, and
    the control unit adjusts the focus position using the second correction value.

3. The focus control apparatus according to claim 1, wherein the plurality of images are captured by shifting a focus position by a predetermined shift amount by the control unit.

4. The focus control apparatus according to claim 1, wherein, in a case where the reliability of the defocus value corresponding to the selected image is lower than the first threshold, the second acquisition unit acquires the first correction value corresponding to the selected image using the defocus values corresponding to an image having the reliability of the defocus value that is equal to or higher than the first threshold among the plurality of images.

5. The focus control apparatus according to claim 1, wherein, in a case where the reliability of the defocus value corresponding to the selected image is lower than the first threshold, the second acquisition unit generates the first correction value corresponding to the selected image from the defocus value corresponding to an image captured when the focus position is at a position closer to a close end than the selected image, and a defocus value corresponding to an image captured when the focus position is at a position closer to an infinite end than the selected image.

6. The focus control apparatus according to claim 1, wherein, in a case where the reliability of the defocus value corresponding to the selected image is lower than the first threshold, the second acquisition unit sets as the first correction value an average of a defocus value corresponding to an image captured when the focus position is at a position closer to a close end than the selected image by the predetermined shift amount and an average of a defocus value corresponding to an image captured when the focus position is at a position closer to an infinite end than the selected image by the predetermined shift amount.

7. The focus control apparatus according to claim 1, wherein, in a case where the reliability of the defocus value corresponding to the selected image is lower than the first threshold, the first acquisition unit obtains a relationship expression between focus positions when images are captured and the defocus values from the defocus values corresponding to the unselected images, and obtains the first correction value using the relationship expression.

8. The focus control apparatus according to claim 1, wherein the focus detection unit detects a plurality of defocus values by performing focus detection a plurality of times at a focus position, and
    the reliability of the defocus value corresponding to each of the plurality of images is obtained based on standard deviation of the plurality of defocus values.

9. The focus control apparatus according to claim 1, wherein each of a plurality of pixels arranged in the image sensor includes a microlens and a plurality of photoelectric conversion portions arranged by being decentered with respect to an optical axis of the microlens.

10. The focus control apparatus according to claim 1, wherein the second acquisition unit acquires a second correction value used for correcting the focus position adjustment based on the defocus value corresponding to each of the plurality of images, and
    in a case where an image having the reliability of the corresponding defocus value that is lower than the first threshold is selected from among the plurality of images, the second acquisition unit obtains the first correction value.

11. The focus control apparatus according to claim 1, wherein the focus detection unit detects a plurality of defocus values by performing focus detection a plurality of times at a focus position, and
    the second acquisition unit obtains an average of the plurality of defocus values as a defocus value corresponding to the image captured at each of the focus positions.

12. The focus control apparatus according to claim 11, wherein the second acquisition unit calculates an average of the defocus values without using a singular point value of the plurality of the defocus values obtained at each of the focus positions, and the average is set as a defocus value corresponding to an image captured at each of the focus positions.

13. The focus control apparatus according to claim 11, wherein the second acquisition unit divides the plurality of defocus values acquired at each of the focus positions into a plurality of groups, acquires variation for each of the plurality of divided groups, excludes a group whose variation is greater than a second threshold, further excludes a group having an average of the defocus values that differs from an average of the defocus values of all of the remaining groups for more than a third threshold, and set an average of the defocus values of the remaining groups as the defocus value of the image captured at each of the focus position.

14. The focus control apparatus according to claim 13, wherein, in a case where a number of the excluded groups is a predetermined number or more, the second acquisition unit sets low reliability.

15. An focus control apparatus comprising:
    a focus detection unit that detects a defocus value;

a control unit that controls focus position adjustment using the defocus value;

an acquisition unit that acquires a first correction value for correcting a detection error of an in-focus position of a focus lens obtained based on the defocus value detected by the focus detection unit; and a storage unit that stores a plurality of images captured by an image sensor at a plurality of focus positions including an in-focus position based on the defocus value detected by the focus detection unit, and the first correction value and reliability of the first correction value in association with each of the plurality of images, wherein, in a case where the reliability of the first correction value associated with a selected image from among the plurality of images is lower than a threshold, the acquisition unit acquires a second correction value of the selected image using the first correction values of a plurality of unselected images among the plurality of images, and wherein the control unit adjust the focus position using the second correction value in a case where the reliability of the first correction value associated with the selected image among the plurality of images is lower than the threshold.

16. The focus control apparatus according to claim 15, wherein the control unit adjusts the focus position using the second correction value in a case where the reliability of the first correction value associated with the selected image among the plurality of images is equals to or higher than the threshold.

17. An image capturing apparatus comprising:

an focus control apparatus that includes:

a focus detection unit that detects a defocus value;

a control unit that controls focus position adjustment using the defocus value;

a first acquisition unit that acquires reliability of the defocus value;

a storage unit that stores a plurality of images captured by an image sensor at a plurality of focus positions including an in-focus position based on the defocus value detected by the focus detection unit, and the defocus value detected for each of the plurality of images by the focus detection unit in association with each of the plurality of images; and a second acquisition unit that, in a case where the reliability of the defocus value corresponding to a selected image from among the plurality of images is lower than a first threshold, acquires a first correction value to be used for correcting the focus position adjustment based on the defocus values of a plurality of unselected images among the plurality of images; and the image sensor that captures an image by photoelectrically converting light emitted from a subject and passed through a focus lens, wherein the control unit adjusts the focus position using the first correction value in a case where the reliability of the defocus value corresponding to the selected image is lower than the first threshold, and wherein the plurality of images stored in the storage unit are those captured by the image sensor.

18. An image capturing apparatus comprising:

an focus control apparatus that includes:

a focus detection unit that detects a defocus value;

a control unit that controls focus position adjustment using the defocus value;

an acquisition unit that acquires a first correction value for correcting a detection error of an in-focus position of a focus lens obtained based on the defocus value detected by the focus detection unit; and a storage unit that stores a plurality of images captured by an image sensor at a plurality of focus positions including an in-focus position based on the defocus value detected by the focus detection unit, and the first correction value and reliability of the first correction value in association with each of the plurality of images; and the image sensor that captures an image by photoelectrically converting light emitted from a subject and passed through a focus lens, wherein, in a case where the reliability of the first correction value associated with a selected image from among the plurality of images is lower than a threshold, the acquisition unit acquires a second correction value of the selected image using the first correction values of a plurality of unselected images among the plurality of images, wherein the control unit adjust the focus position using the second correction value in a case where the reliability of the first correction value associated with the selected image among the plurality of images is lower than the threshold, and wherein the plurality of images stored in the storage unit are those captured by the image sensor.

* * * * *